US011989842B2

(12) United States Patent
Lohr et al.

(10) Patent No.: US 11,989,842 B2
(45) Date of Patent: May 21, 2024

(54) HEAD-MOUNTED DISPLAY WITH PASS-THROUGH IMAGING

(71) Applicant: Valve Corporation, Bellevue, WA (US)

(72) Inventors: Charles N. Lohr, Bellevue, WA (US); Gordon Wayne Stoll, Sammamish, WA (US)

(73) Assignee: VALVE CORPORATION, Bellevue, WA (US)

( * ) Notice: Subject to any disclaimer, the term of this patent is extended or adjusted under 35 U.S.C. 154(b) by 66 days.

(21) Appl. No.: 17/828,897

(22) Filed: May 31, 2022

(65) Prior Publication Data

US 2022/0292790 A1 Sep. 15, 2022

Related U.S. Application Data

(62) Division of application No. 16/848,332, filed on Apr. 14, 2020, now Pat. No. 11,361,513.

(60) Provisional application No. 62/837,668, filed on Apr. 23, 2019.

(51) Int. Cl.
*G06T 19/00* (2011.01)
*G02B 27/01* (2006.01)
*G06T 15/20* (2011.01)

(52) U.S. Cl.
CPC ........ *G06T 19/006* (2013.01); *G02B 27/0172* (2013.01); *G02B 2027/0138* (2013.01); *G02B 2027/014* (2013.01); *G02B 2027/0178* (2013.01); *G02B 2027/0187* (2013.01); *G06T 15/20* (2013.01); *G06T 2200/04* (2013.01)

(58) Field of Classification Search
CPC .... G06T 19/006; G06T 15/20; G06T 2200/04
See application file for complete search history.

(56) References Cited

U.S. PATENT DOCUMENTS

| 9,323,325 | B2 | 4/2016 | Perez et al. |
| 9,538,962 | B1 | 1/2017 | Hannaford et al. |
| 9,606,363 | B2 | 3/2017 | Zalewski |

(Continued)

FOREIGN PATENT DOCUMENTS

| JP | 2001211403 A | 8/2001 |
| WO | WO2019027530 A1 | 2/2019 |
| WO | 2019072483 A1 | 4/2019 |

OTHER PUBLICATIONS

Partial European Search Report dated Nov. 21, 2022 for European Patent Application No. 20794619.5, 11 pages.
Chinese Office Action dated Aug. 15, 2023 for Chinese Patent Application No. 202080030592.5, a foreign counterpart to U.S. Pat. No. 11,361,513, 23 pages.
Extended European Search Report dated Mar. 1, 2023 for European Patent Application No. 20794619.5, 13 pages.
Office Action for U.S. Appl. No. 16/848,332, dated Sep. 20, 2021, Lohr, "Head-Mounted Display With Pass-Through Imaging", 10 Pages.

(Continued)

*Primary Examiner* — Grace Q Li
(74) *Attorney, Agent, or Firm* — Lee & Hayes P.C.

(57) ABSTRACT

This application describes a head-mounted display (HMD) for use in virtual-reality (VR) environments. The systems and methods described herein may determine information about a real-world environment surrounding the user, a location of the user within the real-world environment, and/or a pose of the user within the real-world environment. Such information may allow the HMD to display images of the real-world environment in a pass-through manner and without detracting the user from the VR environment. In some instances, the HMD may pass-through images of the real-world environment based on one or more triggering events.

20 Claims, 6 Drawing Sheets

(56) References Cited

U.S. PATENT DOCUMENTS

| | | |
|---|---|---|
| 2013/0215112 A1* | 8/2013 | Ho .................... G06F 3/011 |
| | | 345/420 |
| 2013/0286004 A1 | 10/2013 | McCulloch |
| 2014/0192164 A1 | 7/2014 | Tenn et al. |
| 2016/0124502 A1 | 5/2016 | Sawyer et al. |
| 2017/0196451 A1* | 7/2017 | Tian .................... G06V 20/64 |
| 2018/0046431 A1 | 2/2018 | Thagadur Shivappa et al. |
| 2018/0095542 A1 | 4/2018 | Mallinson |
| 2019/0043259 A1 | 2/2019 | Wang et al. |
| 2020/0012335 A1 | 1/2020 | Schmollgruber et al. |
| 2020/0342673 A1 | 10/2020 | Lohr et al. |
| 2020/0368616 A1 | 11/2020 | Delamont |

OTHER PUBLICATIONS

The Invitation to Pay Additional Fees dated Jul. 7, 2020 for PCT Application No. PCT/US20/29398, 2 pages.
The International Report on Preliminary Patentability for PCT Application No. PCT/US20/29398, dated Nov. 4, 2021.
The PCT Search Report and Written Opinion dated Sep. 4, 2020 for PCT application No. PCT/US20/29398, 12 pages.
Japanese Office Action mailed Mar. 5, 2024 for Japanese Application No. 2021-562835, a foreign counterpart to U.S. Pat. No. 11,361,513, 10 pages.

* cited by examiner

HEAD-MOUNTED DISPLAY WITH PASS-THROUGH IMAGING

CROSS REFERENCE TO RELATED APPLICATIONS

This patent application is a divisional of and claims priority to and U.S. patent application Ser. No. 16/848,332, filed Apr. 14, 2020, entitled "HEAD-MOUNTED DISPLAY WITH PASS-THROUGH IMAGING," which claims priority to U.S. Provisional Patent Application Ser. No. 62/837,668, filed Apr. 23, 2019, the entire contents of which are fully incorporated herein by reference.

BACKGROUND

Head-mounted displays are used in various applications including engineering, medical, military, and video gaming. In some instances, head-mounted displays may present information or images to a user as part of a virtual-reality or augmented-reality environment. For example, while playing a video game, a user may wear a head-mounted display to immerse the user within a virtual environment. Although providing an immersive experience, head-mounted displays block a view of the physical or real-world. As a result, users may find it difficult to pick up objects (e.g., controller) and/or recognize other individuals within the real world. Additionally, users may be unaware of physical boundaries within the real-world (e.g., walls). While removing the head-mounted display may allow the user to see, constantly taking off and putting back on the head-mounted display may be tedious, may require the user to re-orient themselves between the virtual environment and the real-world, and/or may otherwise detract from virtual-reality experiences.

BRIEF DESCRIPTION OF THE DRAWINGS

The detailed description is described with reference to the accompanying figures. In the figures, the left-most digit(s) of a reference number identifies the figure in which the reference number first appears. The same, or like, reference numbers in different figures indicate similar or identical items.

DETAILED DESCRIPTION

Head-mounted displays are worn by users to view and interact with content in virtual-reality environments. To provide an immersive experience, head-mounted displays may cover a large portion or even all of the user's field-of-view. As such, head-mounted displays may block the user's vision from the real-world, which may result in the user tripping over objects, running into furniture, failing to notice individuals within the real-world, and so forth. Removing the head-mounted display allows the user to see the real-world but requires the user to re-orient themselves between virtual-reality environments and the real-world, respectively. Some head-mounted displays may include, for example a visor that opens to allow the user to look into the real-world. Such solution, however, interrupts an immersion of the user within the virtual-reality environment.

In an effort to overcome these deficiencies, some head-mounted displays may enable pass-through imaging that allow respective users to view the real-world without removing their respective head-mounted display. However, existing pass-through imaging tends to exhibit fairly crude response times, may fail to depict the real-world from a perspective or point-of-view of the user, and/or may be distorted. As a result, users may become unbalanced, dizzy, disoriented, or even ill.

This application describes, in part, a head-mounted display (HMD) for use in virtual-reality (VR) environments. The systems and methods described herein may determine information about a real-world environment surrounding the user, a location of the user within the real-world environment, and/or a pose of the user within the real-world environment. Such information may allow the HMD to display images of the real-world environment in a pass-through manner and without detracting the user from the VR environment. In some instances, the HMD may pass-through images of the real-world environment based on one or more triggering events. For example, while the HMD is worn and while the user is immersed within the VR environment, the user may actuate a button that allows the user to look around within the real-world environment. As an additional example, if the user hears something suspicious or of interest, if the user wants to locate an item in the real-world environment (e.g., controller), and/or if a visitor enters a vicinity of the user, the HMD may display content associated with the real-world environment. In some instances, the content may be provided to the user in an aesthetic way to limit detracting the user from the VR environment. For example, the content may be provided as an overlay to virtual content associated with the VR environment. In such instances, the user may continue to wear the HMD and remain immersed within the VR environment. Accordingly, the HMD according to the instant application may increase user experiences when transitioning or displaying content between the real-world environment and the VR environment.

The HMD may include a front having a display worn on the face, adjacent to the eyes, of the user. The display may output images (or other content) for viewing by the user. As an example, the user may wear the HMD to play a game or view media content (e.g., movie).

The HMD may include cameras that capture images of the real-world environment. In some instances, the cameras may mount to the display and/or may be incorporated within the front of the HMD. Additionally, or alternatively, the cameras may be forward facing to capture images external to the HMD and in front of the user. Moreover, in some instances, the cameras may be separate from the HMD and placed throughout the environment or on other portions of the user (e.g., waist).

In some instances, the cameras may be spatially separated such that the optical axis of the cameras are parallel and separated by a known distance. The cameras may therefore capture images of the real-world environment from a slightly different viewpoint. The diversity of information between the viewpoints may be used to calculate depth information (i.e., stereo camera imaging) of the real-world environment. For example, the HMD and/or a communicatively coupled computing device (e.g., gaming console, personal computer, etc.) may use the image data captured by the cameras to generate depth information associated with the real-world environment.

For example, the cameras may include a first camera and a second camera displaced horizontally and/or vertically from one another on the front of the HMD. In some instances, the first camera may be located on the front at a first side of the HMD, while the second camera may be located on the front at a second side of the HMD. However, as noted above, the first camera and the second cameras may be located elsewhere within the environment and/or on other portions of the user.

The image data captured by the first camera and/or the second camera may represent different views of the real-world environment (e.g., room). By comparing the images (or image data) captured by the first camera and/or the second camera, the HMD (and/or another communicatively coupled computing device) may determine differences or disparities (e.g., using a disparity mapping algorithm). The disparities may represent a difference in coordinates of corresponding image points in the two images. As the disparities (or disparity values) are inversely proportional to depths within the real-world environment, the HMD and/or another communicatively coupled computing device, such as a gaming console, may determine depth information associated with the real-world environment (or a portion thereof). In some instances, the depth information may be from the perspective of the user (i.e., the user's gaze).

Using the depth information, the HMD and/or another communicatively coupled computing device such as a gaming console may generate a depth map or a three-dimension (3D) mesh of the real-world environment (or a portion thereof). For example, the depth map may represent distances between the user and objects within the real-world environment (e.g., walls of a room, furniture, etc.). Additionally, or alternatively, the HMD may include other sensors utilized to generate the depth map and/or 3D. For example, the HMD may include a depth sensor to determine distances between the user and objects in the real-world environment and may determine that the user is proximate (e.g., predetermined proximity or threshold proximity) to objects, or a boundary, of the real-world environment. However, the HMD or the gaming console may additionally, or alternatively, use light detection and ranging (LIDAR), ultrasonic ranging, stereoscopic ranging, structured light analysis, dot projection, particle projection, time-of-flight observations, and so forth for use in generating the depth map and/or 3D mesh.

Upon generating the depth map and/or 3D mesh of the real-world environment, the HMD and/or another communicatively coupled computing device, such as a gaming console, may project image data onto the depth map and/or 3D mesh. In this sense, the image data may be first utilized to generate the depth map and/or 3D mesh, and secondarily may be superimposed, overlaid, or projected onto the depth map and/or 3D mesh. In doing so, the HMD may display content to depict the real-world environment to the user.

In some instances, the depth map, the 3D mesh, and/or the images captured by the first camera and/or the second camera may be modified to account for a pose or point-of-view the user. For example, as the cameras may not align (e.g., horizontally, vertically, and depth wise) with the eyes of the user (i.e., the cameras are not in the exact position of the eyes of the user), the depth map and/or 3D mesh may account for this discrepancy. In other words, the image data captured by the first camera and the second camera may represent a point-of-view that is different than the point-of-view of the user. Failing to account for this discrepancy may illustrate an imperfect real-world environment and the user may find it difficult to pick up objects as the depth values or image data is not from the point-of-view of the user. For example, because the cameras capture image data from a perspective and/or depth that is different than the perspective and/or depth of the eyes of the user (i.e., the cameras are not in the same position horizontally, vertically, and or depth wise as the eyes of the user), the 3D mesh may account for this offset to accurately portray and present an undistorted view of the real-world environment to the user. That is, the depth map, the 3D mesh, and/or the image data may be modified based at least in part on a difference (or offset) in coordinate positions (or location) of the first camera and the second camera and the eyes (e.g., a first eye and/or a second eye) or point-of-view of the user. Accordingly, the images of the real-world environment displayed to the user may accurately represent objects in the real-world environment from the perspective of the user.

Additionally, or alternatively, in some instances, the HMD and/or the real-world environment may include sensors that track a gaze, point-of-view, and/or field-of-view of the user. For example, the HMD may include a interpupillary distance (IPD) sensor to measure the distance between pupils of the eyes of the user and/or other sensors that detect an eye gaze direction of the user. Such sensors may be utilized to determine the point-of-view of the user to accurately portray images of the real-world environment to the user.

Pass-through imaging may allow the user to interact with and view objects in the real-world environment, such as co-workers, computer screens, mobile devices, etc. In some instances, the user may toggle or switch between the VR environment and the real-world environment or the HMD may automatically switch between the VR environment and the real-world environment in response to one or more triggering events. That is, the HMD may include one or more modes, such as a pass-through mode where the real-world environment is presented to the user and/or a virtual-reality mode where the VR environment is presented to the user. As an example, while wearing the HMD, the user may want to take a drink of water. Rather than removing the HMD, the user may actuate (e.g., double press) a button on the HMD that causes display of the real-world environment. In turn, the display may present images of the real-world environment to allow user to locate his or her glass of water and without taking off the HMD. Thereafter, after locating the glass of water, the user may actuate the button (e.g., single press) to cause the display to present virtual content of the VR environment. As such the passed-through images representing the real-word environment may permit users to move about the real-world environment to locate objects and without bumping into objects (e.g., furniture). As an additional example, the pass-through images may represent another individual that comes into a real-world environment of the user. Here, the HMD may detect the other individual and may present images on the display such that the user may recognize or be made aware of the other individual.

In some instances, content associated with the real-word environment displayed to the user may be partially transparent to maintain the user's sense of being in the VR environment. In some instances, content associated with the real-word environment may be combined with the virtual content or only the content associated with the real-world environment may be presented (e.g., 100 percent pass-through imaging). Additionally, or alternatively, in some instances, the images captured by the cameras may be presented on an entirety of the display or may be presented within a specific portion. Moreover, in some instances, content associated with the real-world environment may be displayed with dotted lines to indicate to the user which content is part of the real-world environment and which content is part of the VR environment. Such presentation may allow the user to see approaching individuals, commotion, and/or objects surrounding the user. Regardless of the specific implementation or configuration, the HMD may to function to display content associated with the real-world environment to warn, detect, or otherwise recognize objects that come within a field-of-view of the user.

In some instances, the HMD and/or other computing devices associated with the VR environment, such as the gaming console, may operate in conjunction with a tracking system within the real-world environment. The tracking system may include sensors that track a position of the user within the real-world environment. Such tracking may be used to determine information about the real-world environment surrounding the user while the user is immersed in the VR environment, such as a location of the user within the environment and/or a pose or point-of-view of the user. Within the real-world environment, the tracking system may determine the location and/or pose of the user. In some instances, the tracking system may determine a location and/or a pose of the user relative to a center of the real-world environment.

In some instances, the tracking system may include lighting elements that emit light (e.g., visible or non-visible) into the real-world environment and sensors which detect incident light. In some instances, to detect the location and/or pose of the user the HMD may include markers. Upon projecting light into the real-world environment, the markers may reflect the light and the sensors may capture incident light reflected by the markers. The captured incident light may be used to track and/or determine the locations of the markers within the environment, which may be used to determine the location and/or pose of the user.

In some instances, the location and/or pose of the user within the real-world environment may be utilized to present warnings, indications, or content to the user. For example, if the user is approaching a wall of the real-world environment, knowing the location of the user and the wall (via the tracking system), the HMD may display images representing the wall within the real-world environment. That is, in addition to, or alternative from, using the images captured by the cameras to determine the user is approaching a wall (i.e., via the depth values), the tracking system may determine the relative location of the user within the real-world environment. Such tracking may assist in presenting images accurately corresponding to a depth (or placement of) objects within the real-world environment.

Moreover, images or data obtained from the tracking system may be used to generate a 3D model (or mesh) of the real-world environment. For example, knowing the location and/or pose of the user, the HMD, the tracking system, the gaming console, and/or another communicatively coupled computing device may determine a relative location of the user within the real-world environment. This location, and/or pose of the user, may be utilized to determine a corresponding portion of the 3D model of the real-world environment were the user is looking (i.e., the field-of-view of the user). For example, as the cameras capture images that are not associated with a point-of-view of the user, the tracking system may determine the gaze, pose, or point-of-view of the user. Such information may be used to determine where the user is looking within the real-world environment. Knowing where the user is looking in the real-world environment may be used to modify the images captured by the cameras. In doing so, the HMD may accurately display the real-world environment.

The HMD, the tracking system, the gaming console, and/or another communicatively coupled computing device may also compare the depth map and/or 3D mesh generated using the image data of the cameras with the 3D model to determine a relative location of the user within the real-world environment. Regardless of the specific implementation, knowing the location and/or pose of the user within the real-world environment, the HMD and/or another communicatively coupled computing device may transform the points of depth map and/or the points of the 3D mesh onto the 3D model of the real-world environment. In turn, the images captured by the cameras may be projected onto the 3D model corresponding to the point-of-view of the user.

Accordingly, in light of the above, this application discusses a HMD that provides pass-through imaging to enhance VR experiences. The pass-through imaging may provide a relatively seamless experience when displaying content of the VR environment and content associated with the real-world environment. Such pass-through imaging provides for a less intrusive and disturbing solution to view content associated with the real-world environment. In some instances, information or content associated with the real-world environment may be selectively provided to the user in response to triggers including, but not limited to motions, sounds, gestures, preconfigured events, user movement changes, etc. Moreover, in some instances, the HMD according to the instant application may take many forms, including helmets, visors, goggles, masks, glasses, and other head or eye wear worn on the head of the user.

The present disclosure provides an overall understanding of the principles of the structure, function, device, and system disclosed herein. One or more examples of the present disclosure are illustrated in the accompanying drawings. Those of ordinary skill in the art will understand that the devices and/or the systems specifically described herein and illustrated in the accompanying drawings are non-limiting embodiments. The features illustrated or described in connection with one embodiment may be combined with the features of other embodiments, including as between systems and methods. Such modifications and variations are intended to be included within the scope of the appended claims.

Figure 1:
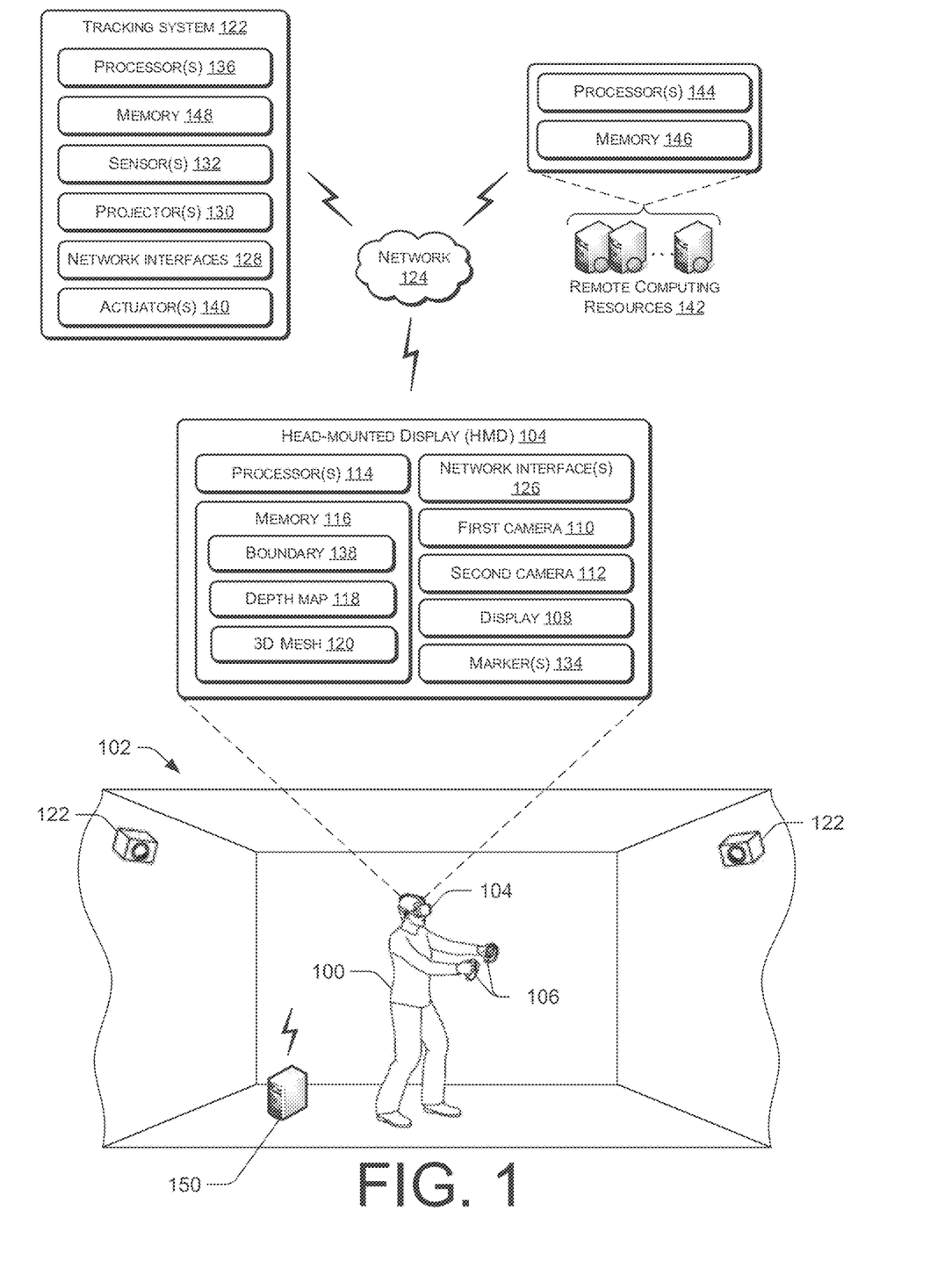
FIG. 1 illustrates a user wearing an example head-mounted display in an example environment, according to an example embodiment of the present disclosure.

FIG. 1 illustrates a user 100 residing within an environment 102 and wearing a HMD 104. In some instances, the user 100 may wear the HMD 104 to immerse the user 100 within a VR environment. In some instances, the user 100 may interact within VR environment using one or more controllers 106. The HMD 104 includes a display 108 for providing virtual content and/or images to the user 100 and in some instances, images capturing devices, such as a first camera 110 and/or a second camera 112.

The first camera 110 and/or the second camera 112 may capture images of the environment 102 and pass-through images of the environment 102 to the user 100 for viewing on the display 108. That is, and as discussed in detail herein, images captured by the first camera 110 and/or the second camera 112 may be presented to the user 100 in a pass-through manner to allow the user 100 to view the environment 102 without having to disengage from the VR environment and/or remove the HMD 104.

In some instances, the first camera 110 and/or the second camera 112 may be disposed within or near a front of the HMD 104. In some instances, the first camera 110 and/or the second camera 112 may represent stereo cameras, infrared (IR) cameras, depth cameras, and/or any combinations thereof. Images captured by the first camera 110 and/or the second camera 112 may represent the environment 102 surrounding the user 100. In some instances, the first camera 110 and/or the second camera 112 may be forward facing to capture images of the environment 102 in front of the user 100. In some instances, the first camera 110 and/or the second camera 112 may be spatially separated such that their optical axes are parallel. Images captured by the first camera 110 and/or the second camera 112 may therefore represent the environment 102 from different viewpoints and may be used to determine depth information associated with the environment 102 (i.e., stereo camera imaging). However, in some instances, the first camera 110 and/or the second camera 112 may be located elsewhere within the environment 102. For example, the first camera 110 and/or the second camera 112 may be located on the floor of the environment 102, may be located on a desk within the environment 102, etc.

As illustrated, the HMD 104 may include processor(s) 114 that carry out or otherwise perform operations associated with the HMD 104. For example, the processor(s) 114 cause the first camera 110 and/or the second camera 112 to capture images, and subsequently, may receive images captured by the first camera 110 and/or the second camera 112, compare the images (or image data), and determine differences therebetween. As the differences are inversely proportional to depths of objects within the environment 102, the processor(s) 114 may determine depth information associated with the environment 102 (e.g., walls, furniture, TVs, etc.).

In some instances, using the depth information, the processor(s) 114 may generate a depth map or 3D mesh of the environment 102. For example, as illustrated, the HMD 104 includes memory 116 that stores or otherwise has access to a depth map 118 of the environment 102 and/or a 3D mesh 120 of the environment 102. As the image data captured by the first camera 110 and/or the second camera 112 represents a portion of the environment 102, the depth map 118 and/or the 3D mesh 120 may correspondingly represent a portion of the environment 102. In some instances, upon generating the depth map 118 and/or the 3D mesh 120, the processor(s) 114 may store the depth map 118 and/or the 3D mesh 120 within the memory 116.

As the image data captured by the first camera 110 and/or the second camera 112, the depth map, and/or the 3D mesh is not from the perspective of the user 100 (i.e., the point-of-view of the user 100), the HMD 104 (and/or another communicatively coupled computing device) may account the placement of the first camera 110 and/or the second camera 112 relative to the perspective of the user 100 (e.g., relative to a first eye and/or a second eye, respectively). That is, whether located on the HMD 104 or elsewhere within the environment, the first camera 110 and/or the second camera 112 do not capture images corresponding to the point-of-view of the user 100 and/or the perspective of the user 100. Accordingly, the image data, or points within the depth map and/or 3D mesh, may be modified or offset to account for this displacement.

In some instances, the HMD 104 may operate in conjunction with a tracking system 122. In some instances, the HMD 104 may communicatively couple to the tracking system 122 over a network 124. For example, the HMD 104 and the tracking system 122 may include one or more interfaces, such as network interfaces 126 and/or network interfaces 128, respectively, to facilitate the wireless connection to the network 124. The network 124 is representative of any type of communication network, including data and/or voice network, and may be implemented using wired infrastructure (e.g., cable, CAT5, fiber optic cable, etc.), a wireless infrastructure (e.g., RF, cellular, microwave, satellite, Bluetooth, etc.), and/or other connection technologies.

The tracking system 122 may include components that determine or track a pose of the user 100, the HMD 104, the first camera 110, and/or the second camera 112 within the environment 102. In this sense, the tracking system 122 may determine the location, orientation, and/or pose of the user 100, the HMD 104, the first camera 110, and/or the second camera 112 at a time in which the first camera 110 and/or the second camera 112 captured images of the environment 102 for passing-through to the user 100. For example, the tracking system 122 (and/or another computing device) may analyze and parse images captured by the tracking system 122 to identify the user 100 within the environment 102 and/or the pose of the user 100. For example, in some instances, the tracking system 122 may include projector(s) 130 and/or sensor(s) 132 that operate to determine the location, orientation, and/or pose of the user 100. As shown, and in some instances, the tracking system 122 may mount to walls of the environment 102. Additionally, or alternatively, the tracking system 122 may mount elsewhere within the environment 102 (e.g., ceiling, floor, etc.).

The projector(s) 130 are configured to generate and project light and/or images into the environment 102. In some instances, the images may include visible light images perceptible to the user 100, visible light images imperceptible to the user 100, images with non-visible light, or a combination thereof. The projector(s) 130 may be implemented with any number of technologies capable of generating the images and projecting within/into the environment 102. Suitable technologies include a digital micromirror device (DMD), liquid crystal on silicon display (LCOS), liquid crystal display, 3LCD, and so forth.

The sensor(s) 132 may include high resolution cameras, infrared (IR) detectors, sensors, 3D cameras, IR cameras, RGB cameras, and so forth. The sensor(s) 132 are configured to image the environment 102 in visible light wavelengths, non-visible light wavelengths, or both. The sensor(s) 132 may be configured to capture information for detecting depth, location, orientation, and/or pose of objects within the environment 102. For example, as the user 100 maneuvers about the environment 102, the sensor(s) 132 may detect positions, orientations, and/or poses of the user 100. In some instances, the sensor(s) 132 may capture some or all angles and positions within the environment 102. Alternatively, the sensor(s) 132 may focus on or capture images within a predefined area of the environment 102.

The projector(s) 130 and/or the sensor(s) 132 may operate in conjunction with marker(s) 134 of the HMD 104. For example, the tracking system 122, via the projector(s) 130, may project light into the environment 102 and the sensor(s)

132 may capture images of the reflections of the marker(s) 134. Using the captured images, the tracking system 122, such as processor(s) 136 of the tracking system 122, may determine distance information to the marker(s) 134. Additionally, or alternatively, the tracking system 122 may detect a pose (e.g., orientation) of the user 100 within the environment 102. In some instances, the marker(s) 134 may be used to determine a point-of-view of the user 100. For example, a distance between the marker(s) 134 and the eyes of the user 100 may be known. In capturing image data of the marker(s) 134, the tracking system 122 (and/or other communicatively coupled computing device) may determine the relative point-of-view of the user 100. Accordingly, the tracking system 122 may utilize the marker(s) 134 of the HMD 104 to determine a relative location and/or pose of the user 100 within the environment 102.

To define or determine characteristics about the environment 102, upon starting a gaming application, the HMD 104 may request the user 100 define a boundary, perimeter, or area of the environment 102 in which the user 100 may maneuver while being immersed in the VR environment. As an example, the processor(s) 114 may cause the display 108 to present instructions to the user 100 to walk around the environment 102 and define a boundary of the environment 102 (or the area in which the user 100 will maneuver while immersed in a VR environment). As the user 100 walks around the environment 102, the HMD 104 may capture images of the environment 102 via the first camera 110 and/or the second camera 112 and the tracking system 122 may track the user 100. Therein, upon determining the boundaries of the environment 102, the tracking system 122 may determine a central location (e.g., origin) of the area. Knowing the central location of the area may allow for the HMD 104 to properly display relative locations of objects or scenes within the environment 102. In some instances, the central location may be represented as (0, 0, 0) in a (X, Y, Z) Cartesian Coordinate System.

In some instances, the tracking system 122 may transmit the boundary and/or central location to the HMD 104. For example, the processor(s) 114 of the HMD 104 may store may store the boundary and/or the central origin in the memory 116, as indicated by boundary 138. Additionally, or alternatively, in some instances, the images captured by the first camera 110 and/or the second camera 112 may be associated with images captured by the tracking system 122. For example, using the images captured by the first camera 110 and/or the second camera 112 while defining the area, depth maps of the environment 102 may be generated. These depth maps may correspondingly be associated with certain locations/poses within the environment 102, as determined through tracking the user 100 throughout the environment 102. In some instances, these depth maps may be combined or otherwise used to generate a 3D model or mesh of the environment 102. In receiving subsequent image data from the HMD 104 and/or the tracking system 122, the location of the user 100 within the environment 102 may be determined, which may assist in determining depth information within the environment 102 and from the perspective, location, or pose of the user. For example, as the image data captured by the first camera 110 and/or the second camera 112 does not correspond to the point-of-view of the user 100, the tracking system 122 may determine a point-of-view of the user 100 via images captured from the marker(s) 134. Using this point-of-view, the image data captured by the first camera 110 and/or the second camera 112 may be modified to represent the point-of-view of the user 100.

For example, as the user 100 engages in the VR environment and maneuvers about the environment 102, the tracking system 122 may determine a relative location of the HMD 104 within the environment 102 by comparing the reflected light from the marker(s) 134 with the central location. Using this information, the HMD 104, the tracking system 122, and/or another communicatively coupled computing device (e.g., gaming console) may determine a distance of the HMD 104 from the central location, or a location of the HMD 104 relative to the central location. Additionally, the HMD 104, the tracking system 122, and/or another communicatively coupled computing device may determine a pose, such as a point-of-view of the user 100 within the environment 102. For example, the tracking system 122 may determine the user 100 is looking towards a ceiling, wall, or floor of the environment 102. Such information may be used to modified or otherwise account for a position of the first camera 110 and/or the second camera 112 relative to the eyes or point-of-view of the user.

In some instances, the tracking system 122 may couple to a chassis with a fixed orientation, or the chassis may couple to actuator(s) 140 such that the chassis may move. The actuators 140 may include piezoelectric actuators, motors, linear actuators, and other devices configured to displace or move the chassis or components of the tracking system 122, such as the projector(s) 130 and/or the sensor(s) 132.

The HMD 104 may additionally, or alternatively, operate in conjunction with remote computing resources 142. The tracking system 122 may also communicatively couple to the remote computing resources 142. In some examples, the HMD 104 and/or the tracking system 122 may communicatively couple to the remote computing resources 142 given that the remote computing resources 142 may have a computational capacity that far exceeds the computational capacity of the HMD 104 and/or the tracking system 122. The HMD 104 and/or the tracking system 122 may therefore utilize the remote computing resources 142 for performing relatively complex analysis and/or generating image data models (or meshes) of the environment 102. For example, the first camera 110 and/or the second camera 112 may capture image data that and the HMD 104 may provide to the remote computing resources 142 over the network 124 for analysis and processing. In some instances, the remote computing resources 142 may transmit content to the HMD 104 for display. For example, in response to a triggering event (e.g., button press) that configures the HMD 104 to pass-through images captured by the first camera 110 and/or the second camera 112, the remote computing resources 142 may transmit a depth map, 3D mesh, and/or 3D model onto which the HMD 104 is to project the images captured by the first camera 110 and/or the second camera 112. As such, images captured by the first camera 110 and/or the second camera 112 for passing onto the user 100 may be transmitted to the remote computing resources 142 for processing and the HMD 104 may receive content to be displayed on the display 108.

As illustrated, the remote computing resources 142 include processor(s) 144 and memory 146, which may store or otherwise have access to some or all of the components described with reference to the memory 116 of the HMD 104. For example, the memory 146 may have access to and utilize the depth map 118, the 3D mesh 120, and/or the boundary 138. The remote computing resources 142 may additionally, or alternatively, store or otherwise have access to memory 148 of the tracking system 122.

In some instances, the remote computing resources 142 may be remote from the environment 102 and the HMD 104 may communicatively couple to the remote computing resources 142 via the network interfaces 126 and over the network 124. The remote computing resources 142 may be implemented as one or more servers and may, in some instances, form a portion of a network-accessible computing platform implemented as a computing infrastructure of processors, storage, software, data access, and so forth that is maintained and accessible via a network such as the Internet. The remote computing resources 142 do not require end-user knowledge of the physical location and configuration of the system that delivers the services. Common expressions associated with these remote computing resources 142 may include "on-demand computing," "software as a service (SaaS)," "platform computing," "network-accessible platform," "cloud services," "data centers," and so forth.

In some instances, the environment 102 may include a computer 150 (or gaming application, gaming console, gaming system) that communicatively couples to the HMD 104, the controllers 106, the tracking system 122, and/or the remote computing resources 142 via the network 124 and/or wired technologies. In some instances, the computer 150 may perform some of or all of the processes described herein, such as those performable by the HMD 104, the controllers 106, the tracking system 122, and/or the remote computing resources 142. For example, the computer 150 may modify image data received from the first camera 110 and/or the second camera 112, or a depth map pertaining thereto, to account for a point-of-view of the user 100. In such instances, the computer 150 may determine or receive an indication from the tracking system 122 regarding the point-of-view of the user 100 and/or an origin of the area where the user is located (e.g., an origin of the real world environment) and/or an origin of a virtual world. Accordingly, the computer may modify the image data received from the first camera 110 and/or the second camera 112, or the depth map pertaining thereto based on the indication received from the tracking system 122. In some embodiments, a time(s) (e.g., time stamp(s)) at which the image data was captured by one or both of the cameras 110, 112 may be used to determine a time difference between a time of capturing image data and a time of displaying the captured image data. For example, the image data that is ultimately displayed to the user may be delayed by tens of milliseconds after the image data was captured by the camera(s) 110 and/or 112. An adjustment may be made to the image data to account for this temporal disparity or disagreement, such as by modifying the pixel data (e.g. through rotational adjustments, and/or translational adjustments) in order to present images as they would appear in the physical world at the time when the imagery is displayed on the HMD, which avoids presenting imagery that appears to lag behind head motion of the user. In some embodiments, the camera (s) 110 and/or 112 may be tracked to maintain time stamp information so that the pose of the camera(s) at a time of capturing the image(s) is known, and so that the pose of the camera(s) at the time the resultant image data is received and processed can be used to accurately represent the imagery spatially, instead of being dependent on camera motion. Moreover, the computer 150 may store or otherwise have access to some or all of the components described with reference to the memory 116, 146, and/or 148.

As used herein, a processor, such as processor(s) 114, 136, 144, and/or a processor of the computer may include multiple processors and/or a processor having multiple cores. Further, the processor(s) may comprise one or more cores of different types. For example, the processor(s) may include application processor units, graphic processing units, and so forth. In one implementation, the processor(s) may comprise a microcontroller and/or a microprocessor. The processor(s) may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that may be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) may possess its own local memory, which also may store program components, program data, and/or one or more operating systems.

As used herein, memory, such as the memory 116, 146, 148, and/or memory of the computer 150 may include volatile and nonvolatile memory, removable and non-removable media implemented in any method or technology for storage of information, such as computer-readable instructions, data structures, program component, or other data. Such memory may include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory may be implemented as computer-readable storage media ("CRSM"), which may be any available physical media accessible by the processor(s) to execute instructions stored on the memory. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

Figure 2:
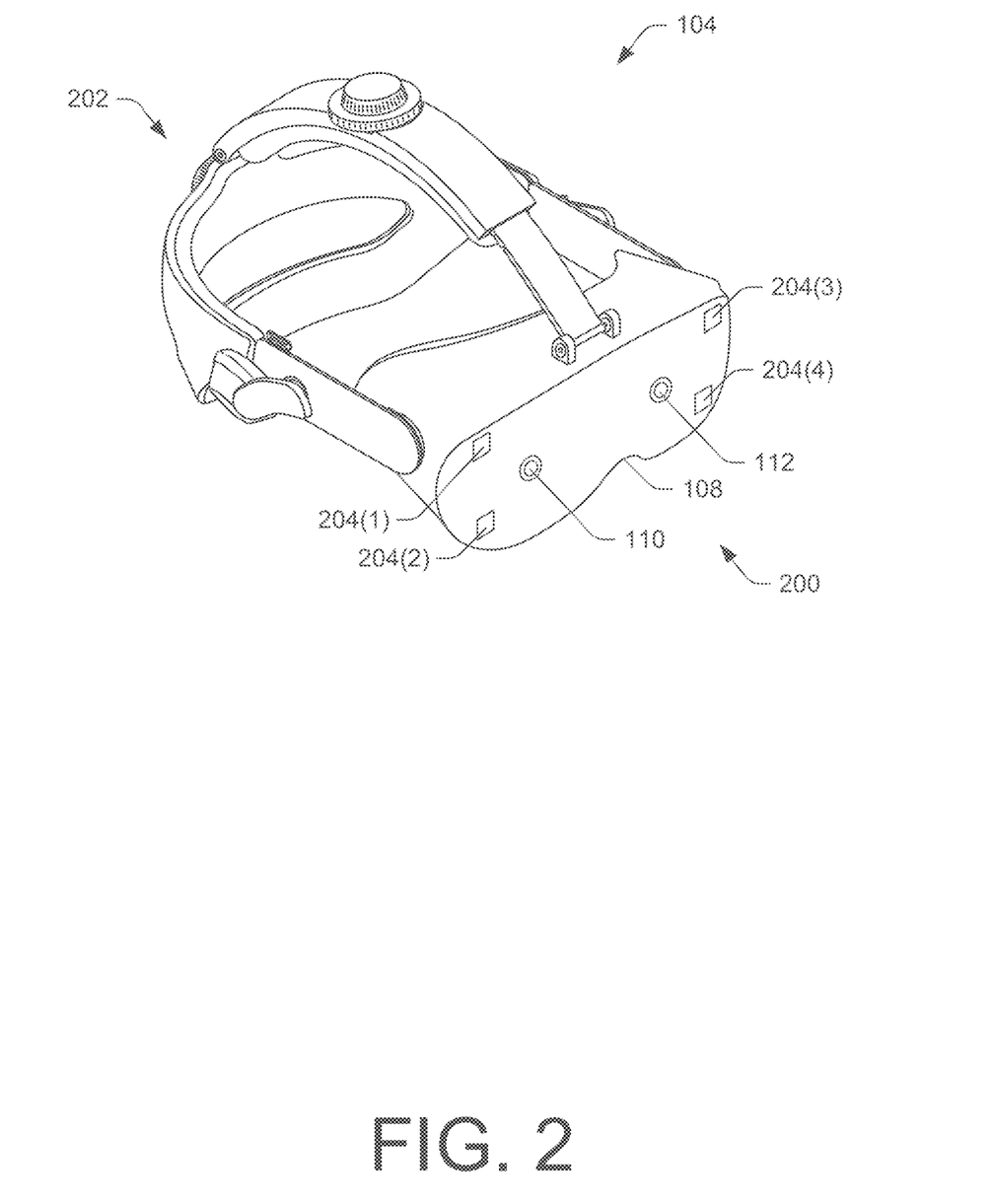
FIG. 2 is a perspective view of head-mounted display of FIG. 1, according to an embodiment of the present disclosure.

FIG. 2 illustrates a perspective view of the HMD 104. The HMD 104 may include a front 200 and a back 202 that secure to the head of the user 100. For instance, the HMD 104 may include strands, cords, sections, straps, bands, or other members that operably couple the front 200 of the HMD 104 and the back 202 of the HMD 104. The front 200 includes the display 108 positioned in front or over the eyes of the user 100 to render images output by an application (e.g., a video game). Discussed above, the display 108 may output images (frames) viewed by the user 100 to make the user 100 perceive the images as if immersed in a VR environment.

In some instances, the front 200 of the HMD 104 may include the first camera 110 and/or the second camera 112. The first camera 110 and/or the second camera 112 may capture images external to the HMD 104 (i.e., of the environment 102) for viewing by the user 100 on the display 108. Noted above, the optical axes of the first camera 110 and the second camera 112 may be parallel and separated by a predetermined distance to generate depth information of at least a portion of the environment 102 using images captured by the first camera 110 and/or the second camera 112. However, in some instances and as discussed above, the HMD 104 may not include the first camera 110 and/or the second camera 112. For example, the first camera 110 and/or the second camera 112 may be located elsewhere within the environment 102.

In either scenario, the first camera 110 and/or the second camera 112 capture images that may not correspond to the point-of-view of the user 100 (i.e., as the first camera 110 and/or the second camera 112 are not in the actual position of the eyes of the user 100). Using the techniques described herein, however, the image data captured by the first camera 110 and/or the second camera 112 may be modified to account for the displacement of the first camera 110 and/or the second camera 112 relative to the point-of-view of the user 100.

For example, to determine the point-of-view of the user 100, the HMD 104 may include the marker(s) 134. As shown in FIG. 2, in some instances, the marker(s) 134 may include a first marker 204(1), a second marker 204(2), a third marker 204(3), and/or a fourth marker 204(4) disposed at corners, edges, or along a periphery of the front 200. However, the marker(s) 134 may be located elsewhere on the HMD 104, such along the top, sides, or the back 202. In some instances, the marker(s) 134 may include infrared elements, reflectors, digital watermarks, and/or images that are responsive to electromagnetic radiation (e.g., infrared light) emitted by the projector(s) 130 of the tracking system 122. Additionally, or alternatively, the marker(s) 134 may include tracking beacons that emit electromagnetic radiation (e.g., infrared light) that is captured by the sensor(s) 132 of the tracking system 122. That is, the projector(s) 130 project light into the environment 102 and the marker(s) 134 may reflect light. The sensor(s) 132 may capture incident light reflected by the marker(s) 134 and the tracking system 122, or another communicatively coupled computing device, such as the remote computing resources 142, may track and plot the locations of the marker(s) 134 within the environment 102 to determine movements, positions, poses and/or orientations of the user 100. The marker(s) 134 may therefore be used to indicate the point-of-view of the user 100 for use in modifying, adjusting, or otherwise adapting the image data from the first camera 110 and/or the second camera 112 before being displayed to the user 100.

Figure 3:
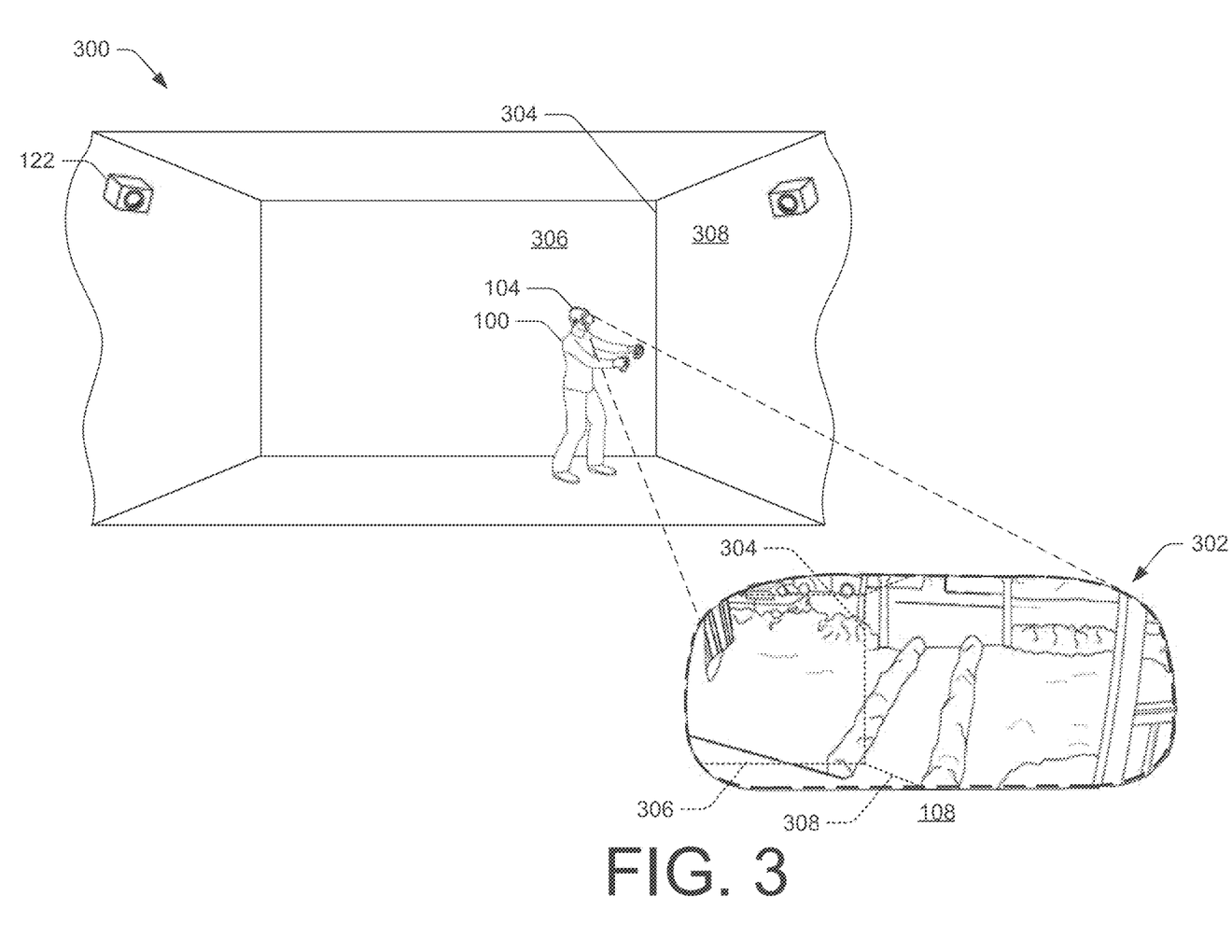
FIG. 3 illustrates a user wearing the head-mounted display of FIG. 1 and the head-mounted display presenting pass-through images, according to an embodiment of the present disclosure.

FIG. 3 illustrates the user 100 wearing the HMD 104 within an environment 300. FIG. 3 illustrates the display 108 of the HMD 104 displaying virtual content 302 while the user 100 is wearing the HMD 104 and interacting within a VR environment. As discussed above, the HMD 104 may display the virtual content 302 as the user 100 moves about the environment 102.

The tracking system 122 may be positioned within the environment 300 to track the user 100 from one location to another and determine a point-of-view of the user 100 within the environment. For example, the tracking system 122 may utilize marker(s) 134 on the HMD 104 to determine a pose (e.g., location and orientation) of the user 100. In some instances, the pose of the user 100 may be relative to a central location of the environment 300. For example, the central location may have coordinates (0, 0, 0), and using reflected light from the marker(s) 134, the tracking system 122 (or the remote computing resources 142) may determine the pose of the user 100 in coordinate space (e.g., (X, Y, Z)). The tracking system 122 may also determine depths of objects within the environment 300 from the perspective or point-of-view of the user 100. Image data received from the first camera 110 and/or the second camera 112 may additionally, or alternatively, be used to determine depth within the environment 300.

The HMD 104 may coordinate display of the virtual content 302 with objects (e.g., furniture, walls, etc.) in the environment 300 and/or within the point-of-view of the user 100 and/or in front of the user 100. In other words, the objects of the environment 300 (or the real-world) displayed to the user 100 may correspond to the point-of-view of the user 100 in the environment 300. For example, the HMD 104 may display objects within the environment 300 using image data captured by the first camera 110 and/or the second camera 112 (e.g., pass-through images) based at least in part on one or more triggering events. That is, the HMD 104 may be configured to display images at a location on the display 108 corresponding to the actual placement of objects in the environment 300. Utilizing the depth map generated from the image data of the first camera 110 and/or the second camera 112 as well as a 3D model or mesh of the environment 300, the pass-through images presented to the user 100 may illustrate objects located at their actual placement within the environment 300 (i.e., proper depth value) and the from point-of-view of the user 100, thereby allowing the user 100 to pick up objects (e.g., controller, glass of water, and so forth). However, in some instances, image data from the first camera 110 and/or the second camera 112 may be continuously captured, and upon detecting of a triggering event, the HMD 104 may display content associated with the environment 300 to the user 100.

As shown in FIG. 3, the triggering event may include determining that the user 100 is approaching or nearing a boundary of the environment 300. For example, the user 100 may approach a corner 304 between two walls 306, 308 of the environment 300. Knowing the location of the user 100 via the tracking system 122, the HMD 104 may display content on the display 108 to indicate that the user 100 is nearing the corner 304. For example, as shown, indications of the corner 304 and the walls 306, 308 may be displayed as dashed or dotted lines on the display 108. In doing so, the user 100 is presented with an indication that the user 100 is about to walk into the walls. In some instances, and as shown in FIG. 3, indications, or content pertaining to the corner 304 and walls 306, 308 may be overlaid (combined with virtual content displayed on the display 108 of the HMD 104) or presented on (or in combination with) the virtual content 302.

Noted above, the image data captured by the first camera 110 and/or the second camera 112 may be modified to account for the point-of-view of the user 100. Additionally, or alternatively, the depth map, the 3D mesh, or a model of the environment may take into account, or factor into consideration, a location of the first camera 110 and/or the second camera 112 relative to the eyes or point-of-view of the user 100. As such, as the first camera 110 and/or the second camera 112 have a point-of-view that may be different than the user 100, the image data may be modified to adjust to the point-of-view of the user prior to presentation on the HMD 104.

While FIG. 3 illustrates a particular implementation of displaying the corner 304 and/or the walls 306, 308 on the display 108, content may be presented differently such as, without modifications, modified for display, embedded, merged, stacked, split, re-rendered, or otherwise manipulated to be appropriately provided to the user 100 without interrupting the immersive virtual experience. For example, in some instances, the content may be displayed in a particular region of the display 108 (e.g., upper right-hand corner). Additionally, or alternatively, the display 108 may only present content associated with the corner 304 and walls 306, 308 so as to have 100 percent pass-through. In some instances, the HMD 104 may fade in content associated with the environment 300 on the display 108.

Figure 4:
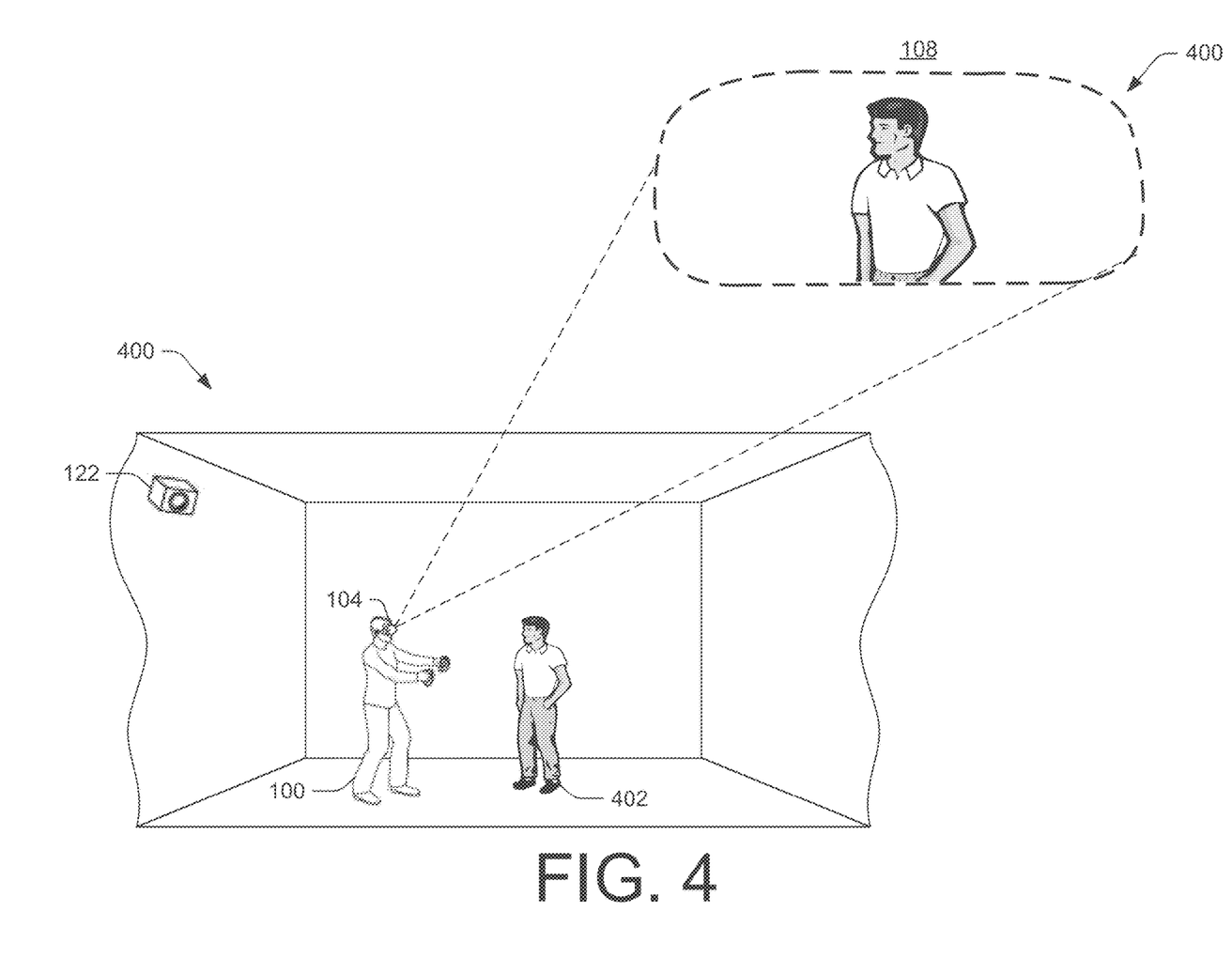
FIG. 4 illustrates a user wearing the head-mounted display of FIG. 1 and the head-mounted display presenting pass-through images, according to an embodiment of the present disclosure.

FIG. 4 illustrates the user 100 wearing the HMD 104 within an environment 400. In some instances, the HMD 104 may display pass-through images based at least in part on one or more triggering events. In some instances, the triggering event may include determining that a visitor 402 has entered the environment 400 and/or a predefined area within the environment 400. As shown in FIG. 4, the display 108 depicts the visitor 402 approaching the user 100 wearing the HMD 104. Here, the visitor 402 appears to be approaching the user 100 and as such, the display 108 may display images captured by the first camera 110 and/or the second camera 112. The images, however, however, may be first modified to account for a different in a point-of-view between the first camera 110 and/or the second camera 112 and the point-of-view of the user 100. In some instances, the HMD 104 may display the visitor 402 based at least in part on the visitor 402 being within the point-of-view of the user 100 and/or in front of the user 100, as determined using the marker(s) 134, while wearing the HMD 104 or coming within a threshold distance of the user 100. In some instances, the visitor 402 may be detected via a motion sensor, analyzing image data from the first camera 110 and/or the second camera 112, via the tracking system 122, etc.

Figure 5:
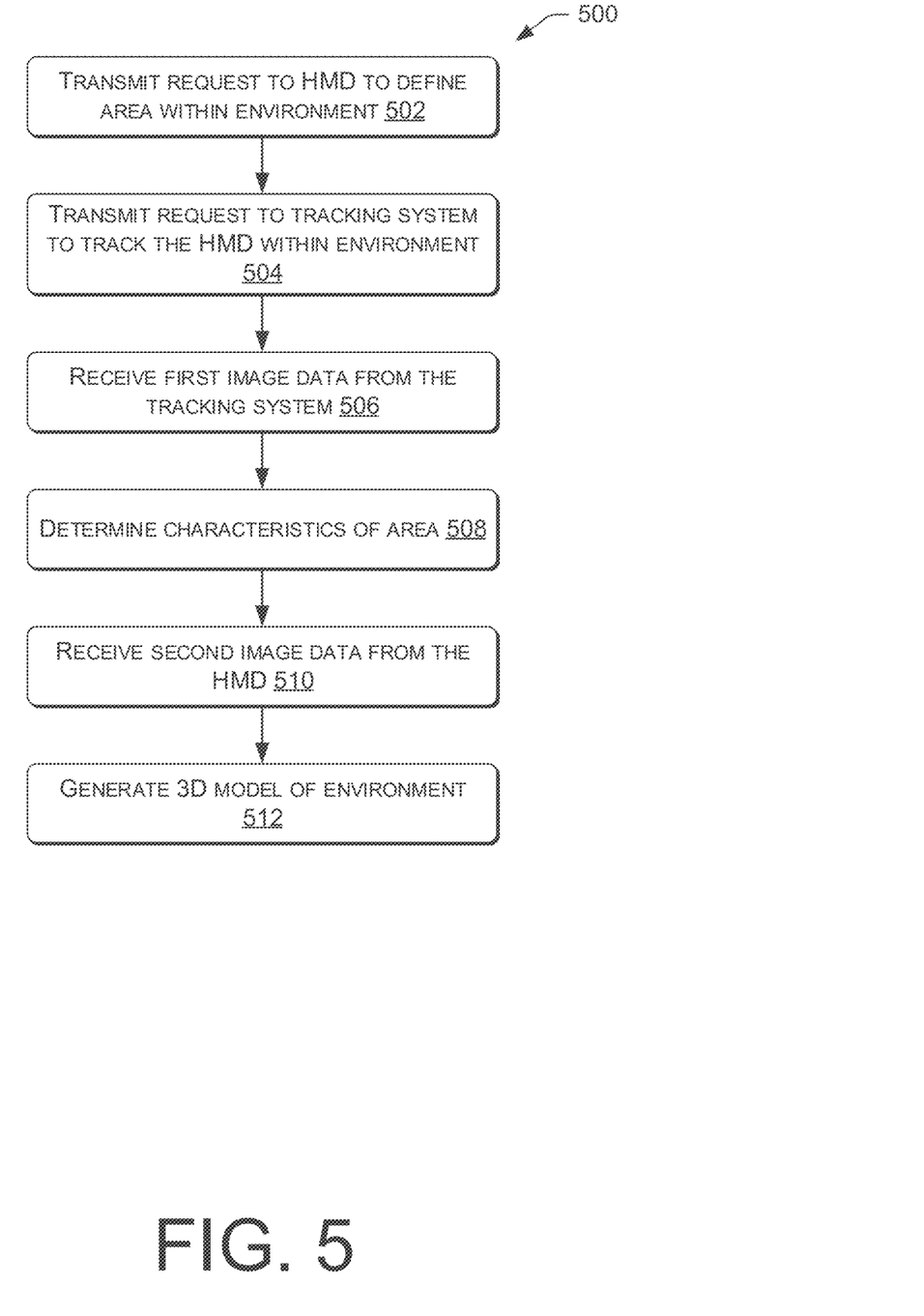
FIG. 5 illustrates an example process for presenting pass-through images using the head-mounted display of FIG. 1, according to an embodiment of the present disclosure.
Figure 6:
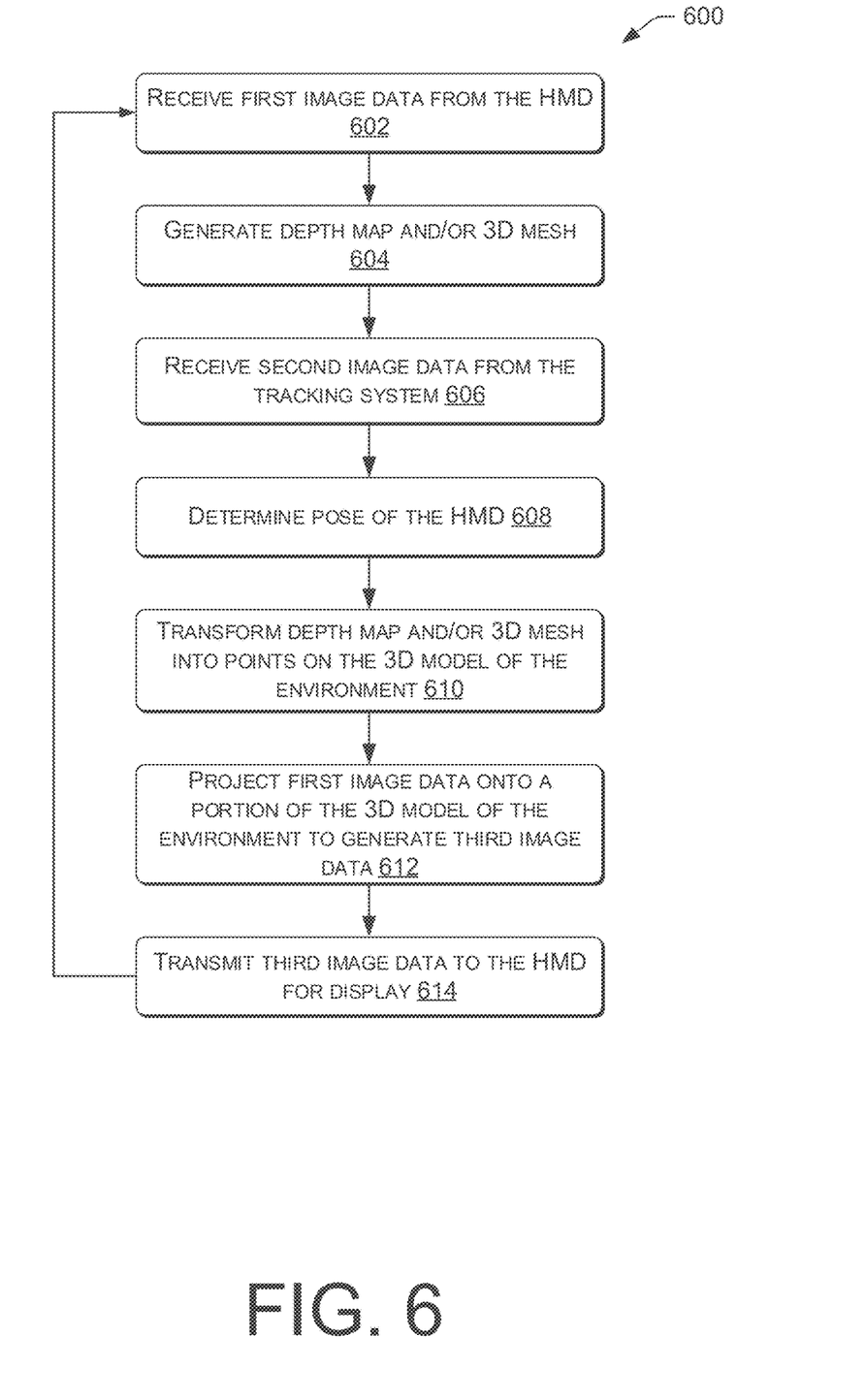
FIG. 6 illustrates an example process for presenting pass-through images using the head-mounted display of FIG. 1, according to an embodiment of the present disclosure.

FIGS. 5 and 6 illustrates processes according to the embodiments of the instant application. The processes described herein are illustrated as collections of blocks in logical flow diagrams, which represent a sequence of operations, some or all of which may be implemented in hardware, software, or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIGS. 1-4, although the processes may be implemented in a wide variety of other environments, architectures and systems.

FIG. 5 illustrates an example process 500 for generating a 3D model, depth map, or mesh of the environment 102. In some instances, the process 500 may be performed by the remote computing resources 142. However, the HMD 104, the tracking system 122, and/or the computer 150 may additionally perform some of or all of the process 500.

At 502, the process 500 may transmit a request to define an area within the environment 102. For example, the remote computing resources 142 may transmit a request to the HMD 104 requesting that the user 100 define an area of the environment 102. In some instances, the area may represent an area in which the user 100 intends to move about while immersed in a VR environment. In response to receiving the request, the processor(s) 114 of the HMD 104 may present the request, or information associated with the request, on the display 108. For example, the request may inform the user 100 to wear the HMD 104 and walk around the environment 102 and define the area in which the user intends move ab out.

At 504, the process 500 may transmit a request to track the HMD 104 within the environment 102 and as the user 100 wears the HMD 104 to define the area. For example, the remote computing resources 142 may transmit a request to the tracking system 122 to track the user 100 throughout the environment 102 while the user 100 defines the area. In some instances, the tracking system 122 may track the user 100 via the projector(s) 130 projecting images into the environment 102 and the sensor(s) 132 capturing images of light reflected via the marker(s) 134 of the HMD 104. In some instances, the remote computing resources 142 may transmit the request at 502 and the request at 504 at the same or substantially the same time.

At 506, the process 500 may receive first image data from the tracking system 122. For example, the remote computing resources 142 may receive first image data from the tracking system 122, where the first image data represents the locations of the HMD 104 and/or the user 100 as the user 100 walks about the environment 102 to define the area. For instances, the first image data may represent the locations and/or poses of the marker(s) 134 within the environment 102. The first image data received by the remote computing resources 142 may include a time stamp at which the images were captured by the tracking system 122 (or the sensor(s) 132).

At 508, the process 500 may determine characteristics of the area. For example, based at least in part on receiving the first image data, the remote computing resources 142 may determine a boundary or perimeter of the area. Additionally, or alternatively, the remote computing resources 142 may determine, based at least in part on the first image data, a center or origin of the area. In some instances, the origin may be defined in 3D space having values (0, 0, 0) that correspond to X, Y, and Z coordinates, respectively, in a Cartesian Coordinate System. Accordingly, in receiving subsequent image data from the tracking system 122 and/or the remote computing resources 142 may determine a relative location of the user 100 (and/or the HMD 104) to the origin of the area.

At 510, the process 500 may receive second image data from the HMD 104. For example, the remote computing resources 142 may receive second image data from the HMD 104, where the second image data represents images captured by the first camera 110 and/or the second camera 112 while the user 100 defines the area of the environment 102. In some instances, the second images data received by the remote computing resources 142 may include a time stamp at which the images were captured by the first camera 110 and/or the second camera 112. That is, while the first camera 110 and/or the second camera 112 capture the images, another communicatively coupled computing device may determine a pose of the user 100 within the environment 102. For example, mentioned above, while the first camera 110 and/or the second camera 112 capture the images, the processor(s) 136 of the tracking system 122 may cause the projector(s) 130 to project the images into the environment 102. The marker(s) 134 of the HMD 104 may reflect light associated with the images and the sensor(s) 132 may capture images of the reflections of the marker(s) 134. Such images may be used to determine depth, location, orientation, and/or pose of the user 100 (and/or the HMD 104) within the environment 102, and may be associated with the image data captured by the first camera 110 and/or the second camera 112.

At 512, the process 500 may generate a 3D model (or mesh) of the environment 102. For example, the remote computing resources 142 may generate a 3D model of the environment 102 based at least in part on the first image data and/or the second image data. For instance, using the second image data, the remote computing resources 142 may compare images captured by the first camera 110 and/or the second camera 112, respectively, to determine disparities. In turn, the remote computing resources 142 may determine depth information of the environment 102 for use in generating the 3D model of the environment 102. Additionally, the remote computing resources 142 may utilize the first image data received from the tracking system 122 to associate the depth map, or depth values of the environment 102, with certain locations within the area and/or the environment 102. In some instances, the remote computing resources 142 may compare or associate the first image data and the second image data (or depth map generated therefrom) using the time stamps at which the first image data and/or the second image data was captured. In some instances, generating the 3D model of the environment 102 may include portraying objects within the environment. For example, the remote computing resources 142 may augment the VR environment with objects (or a volume) in the environment 102, such as a chair. In some instances, the 3D model may be transmitted to the HMD 104 and/or the tracking system 122, and/or may be stored in memory of the HMD 104, the tracking system 122, and/or the remote computing resources 142.

FIG. 6 illustrates an example process 600 for passing-through images on a HMD, such as the HMD 104. In some instances, the process 600 may continue from 512 of the process 500, after the 3D model of the environment 102 is generated. In other words, in some instances, after the 3D model is generated, the HMD 104 may display pass-through images to enable the user 100 to switch between a VR environment and real-world environment (i.e., the environment 102). In some instances, the process 600 may be performed by the remote computing resources 142. However, the HMD 104, the tracking system 122, and/or the computer 150 may additionally perform some of or all of the process 600.

At 602, the process 600 may receive first image data from the HMD 104. For example, the remote computing resources 142 may receive first image data from the HMD 104, where the first image data represents images captured by the first camera 110 and/or the second camera 112. In some instances, the remote computing resources 142 may receive the first image data based at least in part on the HMD 104 detecting a trigger event, such as a press of a button by the user 100, a verbal command issued by the user 100, motion being detected within the environment 102 (e.g., visitor approaching the user 100), and/or the user 100 nearing or coming within a threshold distance of a boundary of the environment 102. In other instances, the remote computing resources 142 may continuously receive the first image data and may be configured to pass-through these images based at least in part on the triggering event. For example, as the user 100 may be immersed within the VR environment, the user 100 may press a button of the HMD 104 to display content external to the HMD 104. In this sense, the HMD 104 may include a pass-through mode that displays images captured by the first camera 110 and/or the second camera 112. Accordingly, based at least in part on detecting the trigger expression, the processor(s) 114 of the HMD 104 may cause the first camera 110 and/or the second camera 112 to capture images of the environment 102.

At 604, the process 600 may generate a depth map and/or a 3D mesh based at least in part on the first image data. For example, the remote computing resources 142 may generate a depth map and/or the 3D mesh based at least in part on the first image data being received from the HMD 104 (i.e., using stereo camera imaging). As the first image data represents a portion of the environment 102, the depth map and/or the 3D mesh may also correspond to a depth map and/or a 3D mesh of the portion of the environment 102. Additionally, or alternatively, the HMD 104 may generate the depth map and/or 3D mesh. For example, upon receiving the image data from the first camera 110 and/or the second camera 112, the processor(s) 114 may utilize stereoscopic camera imaging to generate the depth map. In some instances, using the depth map, the processor(s) 114 may generate a 3D mesh of the environment 102. Additionally, in some instances, the processor(s) 114 may store the depth map and/or 3D mesh, such as the depth map 118 and/or the 3D mesh 120 within the memory 116.

In some instances, the HMD 104, the remote computing resources 142, and/or the computer 150 may modify the first image data received from the first camera 110 and/or the second camera 112 prior to generating the depth map and/or the 3D mesh. For example, as the first image data may not represent a point-of-view of the user 100, the first image data may be modified (e.g., translated, transformed, skewed, etc.) to account for a different between the point-of-view of the first camera 110 and the second camera 112, and the point-of-view of the user 100. In some instances, the point-of-view of the user 100 may be determined using the tracking system 122 and the position of the marker(s) 134 within the environment 102. Additionally, or alternatively, after generating the depth map and/or the 3D mesh, the depth map and/or the 3D mesh may be modified according to or based at least in part on the point-of-view of the user 100.

At 606, the process 600 may receive second image data form the tracking system 122 representing a pose of the HMD 104. For example, the remote computing resources 142 may receive, from the tracking system 122, second image data corresponding to the HMD 104 within the environment 102. As discussed above, the second image data may be captured by sensor(s) 132 of the tracking system 122 which detect light reflected by the marker(s) 134 of the HMD 104 in response to the images being projected by the projector(s) 130.

At 608, the process 600 may determine a pose of the HMD 104. For example, based at least in part on receiving the second image data, the remote computing resources 142 may determine a pose of the HMD 104 within the environment 102. In some instances, the pose may represent a location of the HMD 104 within the environment 102 and/or an orientation of the HMD 104 within the environment 102. That is, the remote computing resources 142 may analyze the first image data and/or the second image data to determine the location of the user 100 within the environment 102 in relation to the center of the environment 102. Such analysis may determine the relative location, gaze, and/or point-of-view of the user 100 with respect to the center of the environment 102, or a particular area within the environment 102.

At 610, the process 600 may transform the depth map and/or 3D mesh into points associated with the 3D model of the environment. For example, the remote computing resources 142 may utilize the pose (e.g., location and orientation) to determine a location of the user 100 within the environment 102 and/or the point-of-view of the user 100 within the environment 102. The remote computing resources 142 may transform the points of the depth map and/or 3D mesh into points associated with the 3D model of the environment 102, thereby accounting for the point-of-view of the user 100. In other words, the processor(s) 144 of the remote computing resources 142 may locate, find, or determine the depth values of points in the 3D model of the environment 102 and by transforming the points of the depth map and/or 3D mesh onto points associated with the 3D model of the environment 102. Using the pose, the remote computing resources 142 may translate the depth map and/or 3D mesh generated at 604 onto the 3D model of the environment 102. Such translating may assist in accurately depicting the environment 102 (e.g., proper depth values) to the user 100. That is, the first image data, together with the second image data and/or the 3D model of the environment 102, may provide an absolute position and/or gaze of the HMD 104, which may assist in depicting the point-of-view of the user 100 at proper depth values or depth perception.

At 612, the process 600 may project the first image data onto a portion of the 3D model to generate third image data. For example, knowing the pose of the user 100, the remote computing resources 142 may project or overlay the first image data onto the portion of the 3D model of the environment 102 to generate the third image data. In some instances, generating the third image data may include cross-blending or filling in depth values and/or color values for certain pixels of the third image data. For example, as the first image data may not represent a point-of-view of the user 100, when generating the third image data depicting the point-of-view of the user 100, the third image data may have undefined depth and/or color values for certain pixels. Here, pixels without color values may be assigned a color value from neighboring pixels, or an average thereof. Additionally, or alternatively, the third image data may be generated using previous depth maps or 3D meshes of the environment 100, particle systems, and so forth.

At 614, the process 600 may transmit the third image data to the HMD 104. For example, after projecting the first image data onto the portion of the 3D model, the remote computing resources 142 may transmit the third image data to the HMD 104, where the third image data represents the first image data as projected onto the portion of the 3D model.

From 614, the process 600 may loop to 602 to receive subsequent image data. As a result, in response to continuous trigger events (e.g., press of a button, voice command, motion detection, etc.), the HMD 104 may transition to a pass-through mode, to provide a convenient way for the user 100 to check out the environment 102 and without having to take off the HMD 104. For example, the remote computing resources 142 may receive an indication, from the tracking system 122, that the user 100 is approaching the boundary of the area and/or is about to run into a wall of the environment 102. Upon receiving this indication, the remote computing resources 142 may receive image data from the HMD 104 representing the point-of-view of the user (i.e., the images captured by the first camera 110 and/or the second camera 112). Upon determining the pose of the user 100, the remote computing resources 142 may project the image data onto the 3D model of the environment 102 and cause the image data to be displayed on the HMD 104. In this sense, the images may be automatically "passed-through" onto the user 100 to allow the user to see the real-world environment without having to break immersion.

While the foregoing invention is described with respect to the specific examples, it is to be understood that the scope of the invention is not limited to these specific examples.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A system comprising:
   a head-mounted display comprising:
      a display;
      a first camera; and
      a second camera;
   one or more processors; and
   one or more non-transitory computer-readable media storing computer-executable instructions that, when executed by the one or more processors, cause the one or more processors to perform acts comprising:
      capturing, via the first camera, first image data representing a first portion of an environment;
      capturing, via the second camera, second image data representing a second portion of the environment;
      determining a first offset of the first camera relative to a first eye of a user and a second offset of the second camera relative to a second eye of the user;
      generating a depth map based at least in part on the first offset and the second offset;
      generating third image data based at least in part on the depth map, the first image data, and the second image data; and
      displaying the third image data via the display.

2. The system of claim 1, wherein the generating of the third image data comprises generating the third image data based at least in part on projecting the first image data and the second image data onto the depth map.

3. The system of claim 1, wherein the head-mounted display further comprises a button, and wherein the displaying of the third image data is based at least in part on detecting a press of the button.

4. The system of claim 1, wherein the acts further comprise receiving an indication that the user is approaching a boundary of the environment, and wherein the displaying of the third image data is based at least in part on the receiving of the indication.

5. The system of claim 1, wherein the user comprises a first user, and wherein the acts further comprise receiving an indication that a visitor is within the environment, and wherein the displaying of the third image data is based at least in part on the receiving of the indication.

6. The system of claim 1, wherein the third image data is displayed in combination with virtual content presented on the display.

7. The system of claim 1, wherein:
   the first offset corresponds to at least one of:
      a horizontal displacement of the first camera relative to the first eye;
      a vertical displacement of the first camera relative to the first eye; or
      a depth wise displacement of the first camera relative to the first eye; and the second offset corresponds at least one of:
- a horizontal displacement of the second camera relative to the second eye;
- a vertical displacement of the second camera relative to the second eye; or
- a depth wise displacement of the second camera relative to the second eye.

8. The system of claim 1, wherein the generating of the third image data comprises:
transmitting, to one or more computing devices, the depth map, the first image data, and the second image data; and
receiving the third image data from the one or more computing devices.

9. A method comprising:
receiving, by a processor, first image data captured by a first camera of a head-mounted display, the first image data representing a first portion of an environment;
receiving, by the processor, second image data captured by a second camera of the head-mounted display, the second image data representing a second portion of the environment;
determining, by the processor, a first offset of the first camera relative to a first eye of a user and a second offset of the second camera relative to a second eye of the user;
generating, by the processor, a depth map based at least in part on the first offset and the second offset;
generating, by the processor, third image data based at least in part on the depth map, the first image data, and the second image data; and
displaying the third image data on the head-mounted display.

10. The method of claim 9, wherein the generating of the third image data comprises generating the third image data based at least in part on projecting the first image data and the second image data onto the depth map.

11. The method of claim 9, further comprising receiving an indication of a trigger event, and wherein the displaying the third image data is based at least in part on the receiving of the indication.

12. The method of claim 11, wherein the indication corresponds to:
detecting a press of a button of the head-mounted display;
detecting a voice command to transition the head-mounted display from a virtual-reality mode to a pass-through mode;
detecting that the user is approaching a boundary of the environment; or
detecting that a visitor is within the environment.

13. The method of claim 9, wherein the third image data is displayed in combination with virtual content presented on the head-mounted display.

14. The method of claim 9, wherein:
the first offset corresponds to at least one of:
- a horizontal displacement of the first camera relative to the first eye;
- a vertical displacement of the first camera relative to the first eye; or
- a depth wise displacement of the first camera relative to the first eye; and the second offset corresponds at least one of:
- a horizontal displacement of the second camera relative to the second eye;
- a vertical displacement of the second camera relative to the second eye; or
- a depth wise displacement of the second camera relative to the second eye.

15. A system comprising:
a head-mounted display;
a first camera disposed on a front of the head-mounted display and facing forward to capture first images of a real-world environment in front of the head-mounted display;
a second camera disposed on the front of the head-mounted display and facing forward to capture second images of the real-world environment in front of the head-mounted display;
one or more processors; and
memory storing computer-executable instructions that, when executed by the one or more processors, cause the one or more processors to perform acts comprising:
receiving first image data associated with the first images captured by the first camera, the first image data representing a first portion of the real-world environment;
receiving second image data associated with the second images captured by the second camera, the second image data representing a second portion of the real-world environment;
determining a first location of the first camera relative to a first eye of a user and a second location of the second camera relative to a second eye of the user;
generating third image data based at least in part on the first location, the second location, the first image data, and the second image data; and
transmitting the third image data to the head-mounted display.

16. The system of claim 15, wherein:
the acts further comprise generating a 3D mesh of a portion of the real-world environment based at least in part on the first location and the second location; and
the generating of the third image data comprises generating the third image data based at least in part on projecting the first image data and the second image data onto the 3D mesh.

17. The system of claim 15, wherein the acts further comprise receiving an indication of a trigger event, and wherein the transmitting of the third image data is based at least in part on the receiving of the indication.

18. The system of claim 17, wherein the indication corresponds to:
detecting a press of a button of the head-mounted display;
detecting a voice command to transition the head-mounted display from a virtual-reality mode to a pass-through mode;
detecting that the user is approaching a boundary of the real-world environment; or
detecting that a visitor is within the real-world environment.

19. The system of claim 15, further comprising:
transmitting, to the head-mounted display, data representing virtual content within a virtual-reality environment, wherein the third image data is transmitted to the head-mounted display for display in combination with the virtual content.

20. The system of claim 15, wherein:
the first location corresponds to a displacement of the first camera relative to the first eye; and
the second location corresponds a displacement of the second camera relative to the second eye.

* * * * *